United States Patent [19]
Kerttula et al.

[11] 3,729,089
[45] Apr. 24, 1973

[54] DEVICE IN BELT CONVEYORS

[76] Inventors: Into Isak Kerttula, Luotsikatu 18 B;
Per Arno Jaatinen, Koivikkotie 12,
both of Helsinki, Finland

[22] Filed: Apr. 6, 1971

[21] Appl. No.: 131,669

[52] U.S. Cl. ............... 198/203, 144/281 B, 198/165
[51] Int. Cl. ................................................ B65g 23/00
[58] Field of Search ....................... 198/203, 208, 165;
74/230, 242.8; 144/281 B; 100/151

[56] References Cited

UNITED STATES PATENTS 3,446,139   5/1969   Coffelt ............................. 100/151 X

FOREIGN PATENTS OR APPLICATIONS 829,876   3/1960   Great Britain ......................... 198/203

Primary Examiner—Richard E. Aegerter
Assistant Examiner—Douglas D. Watts
Attorney—Waters, Roditi, Schwartz & Nissen

[57] ABSTRACT

A device in belt conveyors intended to increase the friction between a conveyor belt and the traction roll about which the belt is entrained. Over the conveyor belt there is fitted a pressure chamber, which is open in the direction facing the belt and which presses the belt against the roll.

1 Claim, 1 Drawing Figure

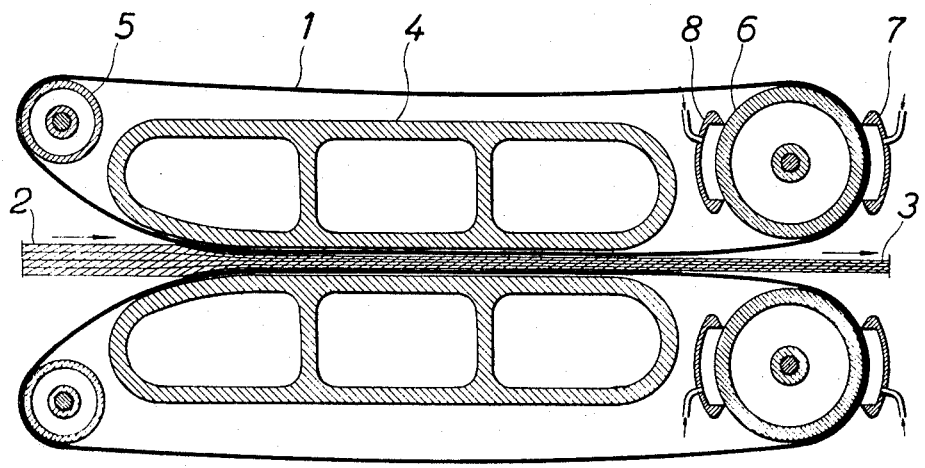

DEVICE IN BELT CONVEYORS

The present invention provides for a device for increasing friction between a conveyor belt and a roll providing traction, which must be high enough in order that no slip might occur between the belt and the roll. The friction may be increased by selecting the materials of belt and roll so that they have a high friction with regard to each other. Rubber, for instance, is such a material.

This, however, cannot always be done. For instance, in continuously acting board presses, in which the board material to be pressed is conveyed between two belts, the belts must consist of metal, preferably of steel, if it is desired to obtain a smooth surface of the board material subjected to pressing.

The friction between the belt and the roll may also be increased by imparting to the belt a degree of tension. However, high tension imposes great stress on the belt, with the consequence of rapid wear, so that it has to be frequently replaced.

The object of the present invention is to provide a device by means of which the friction between the belt and roll surface may be substantially increased, independently of the material of the belt and roll and of the tension of the belt. The invention is characterized in that there is fitted onto the conveyor belt a pressure chamber, which has an open surface in the direction facing the belt and which is adapted to provide pressure for pressing the belt against the roll.

If the length of the roll, and thus also the width of the belt and of the pressure chamber, is e.g. about 150 cm and the extension of the pressure chamber in the circumferential direction of the roll is e.g. 70 cm, and if the pressure of the medium in the pressure chamber is as low as e.g. 3 kg/cm$^2$, the force with which the pressure in the pressure chamber urges the conveyor belt against the roll will be about 31,500 kg, that is, of a quite unexpectedly high extent.

A force of such magnitude may impose an expressive stress on the bearings supporting the roll. In order to avoid this, according to the invention another pressure chamber, open in the direction facing the roll, is positioned on the diametrically opposite side of the roll. The forces produced by the pressure chambers thus cancel or balance out.

The invention is described in a preferred embodiment with reference to the attached drawing which presents a continuously acting board press in longitudinal section.

The press consists of two endless conveyor belts 1, which have between them a press gap. The belts, which in this case consist of steel, convey the board material to be pressed therebetween, and which is composed of veneers 2, which are fed into the press gap between the belts 1, whence they emerge in the shape of pressed, completed plywood 3. In the press gap, body parts 4 serve as supports for the belts 1, and the belts slide along these parts. The friction attendant on sliding therealong may be reduced in different ways known in the art.

The belts pass over end rolls 5 and 6 of which the end rolls 6 illustrated on the right are rolls providing traction. In order to counteract any possibility of slipping, the steel belts 1 are pressed against the upper and lower traction rolls 6 by the pressure imparted from pressure chambers 7. In order that the bearing stresses of the traction rolls 6 are reduced, on their diametrically opposite sides second pressure chambers 8 are fitted. It is obvious to one skilled in the art that various embodiments of the invention may fall within the scope of the patent claims set forth below. The conveyor belts 1 need not necessarily be steel belts. Utilization of a device according to the invention is not restricted to continuously acting board presses; but may be used in connection with any endless belt conveyor where there is a risk that slipping may occur between the belt and the roll providing traction.

We claim:

1. In a device for increasing the friction between the conveyor belt of a belt conveyor and a traction roll about which said conveyor belt is entrained, the improvement comprising; a pressure chamber having an open surface facing said belt in the region of said belt contacting said traction roll, said pressure chamber being adapted to impart a pressure to the surface of said belt so as to increase the friction between the latter and said roll, and a second pressure chamber positioned on the diametrically opposed side of said traction roll, said chamber having an open surface facing the roll and adapted to impart a pressure thereto in opposition to the pressure of said first pressure chamber.

* * * * *